UNITED STATES PATENT OFFICE 2,553,774

N-THIOTRICHLOROMETHYL MORPHOLINE AND FUNGICIDAL COMPOSITIONS CONTAINING SAME

Roger S. Hawley, Linden, N. J., assignor to Standard Oil Development Company, a corporation of Delaware No Drawing. Application June 11, 1949,
Serial No. 98,621

8 Claims. (Cl. 167—33)

This invention relates to new and useful improvements in parasiticidal preparations and more particularly to improved fungicides, insecticides, and germicides. This invention also relates to methods of protecting organic material subject to attack by low orders of organisms. This invention further relates to the synthesis of a new chemical compound, N-thiotrichloromethyl morpholine corresponding to the formula:

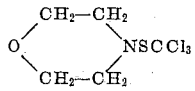

U. S. applications, Serial Nos. 773,925, filed September 13, 1947 now abandoned, and 90,271, filed April 28, 1949, disclose N-thiotrichloromethyl imides of dicarboxylic acids as active parasiticides.

It has now been found that N-thiotrichloromethyl derivatives of heterocyclic nitrogen containing rings and particularly N-thiotrichloromethyl morpholine are extremely effective for checking the growth of bacteria, fungi, and insects. These compounds may thus be used as novel ingredients of seed and plant protectants because of their disinfecting action on soil containing harmful organisms.

Suitable compounds of the indicated type are thus illustrated by Formula I below:

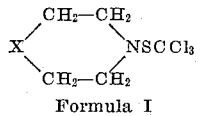

Formula I where X is a radical selected from the group consisting of —O—, —S—, and —CH₂—. Substituted nuclear derivatives of these compounds may also be used, as the

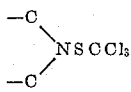

portion of the compounds is believed to be the physiologically potent group. The nuclear substituted groups thus may be alkyl, halogen, and similar groups.

The novel N-thiotrichloromethyl heterocyclic compounds of this invention may be prepared in general by the reaction of perchloromethylmercaptan (ClSCCl₃), with the corresponding nitrogen containing heterocyclic compound. Formula II illustrates this reaction between morpholine and perchloromethylmercaptan.

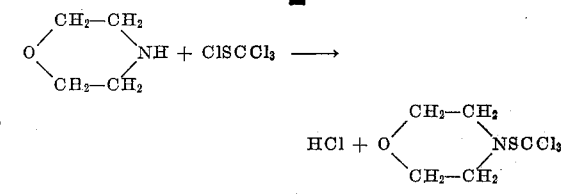

Formula II

The preparation of the morpholine starting material is known in the art and is not the subject of this invention and therefore has not been here described.

N-thiotrichloromethyl morpholine can be prepared in general by first dissolving the morpholine in water. The mixture is then stirred and the temperature kept below about 80° C. An approximately equal quantity of perchloromethylmercaptan is added over a period of about one hour. The reaction is continued for about an hour after all the mercaptan has been added. After cooling, the reaction mixture is filtered to remove the N-thiotrichloromethyl morpholine product which has precipitated out.

The N-thiotrichloromethyl morpholine can also be prepared in an organic solvent such as benzene or dioxane. The reaction is conducted as discussed in the preceding paragraph. The morpholine hydrochloride is relatively insoluble in the organic solvent and separates out and can be reused as feed material. The N-thiotrichloromethyl morpholine, which is more soluble in the organic solvent, is then crystallized therefrom by concentration of the solvent. If insufficient solvent is used to dissolve all the N-thiotrichloromethyl morpholine, some will precipitate out and can be separated from the morpholine hydrochloride by water washing out the morpholine hydrochloride or by extracting the N-thiotrichloromethyl morpholine with more organic solvent.

The following examples are given to illustrate this invention and include both the preparation of N-thiotrichloromethyl morpholine which is made from the cheap and readily available morpholine, and test results obtained on its use as a fungicide.

EXAMPLE I

*Preparation of N-thiotrichloromethyl morpholine*

To a 2-liter, 3-neck flask equipped with a stirrer, condenser, thermometer, and dropping funnel, was added 26.1 gms. (0.3 mol) of morpholine and about 200 cc. of benzene. 55.8 gms. (0.3 mol) of perchloromethylmercaptan was added dropwise with stirring. It was necessary to add more benzene (700 cc.) during the addition of perchloromethylmercaptan on account of the precipitate formed. The addition of perchloromethylmercaptan took about 45 minutes and the temperature did not rise above 40° C. Stirring was continued about one hour after all the perchloromethylmercaptan had been added. The mixture was allowed to stand overnight and then cooled and filtered. The white precipitate was washed with petroleum ether on a Buchner funnel, filtered, and dried. Yield—20.0 gms. of morpholine hydrochloride containing some N-thiotrichloromethyl morpholine. The filtrate was concentrated on a steam bath with reduced pressure and the residue on cooling solidified, giving needle-like crystals. The crystals were washed twice with a small amount of cold petroleum ether, filtered, and air dried. 21 gms. were obtained of white crystalline material, which is somewhat soluble in petroleum ether. About 10 gms. more were obtained on evaporating off the petroleum ether from the filtrate from the petroleum ether washings of the final product. Analysis of a sample of the 21 gms. of the white crystalline product—N-thiotrichloromethyl morpholine gave 25.37% C, 44.39% Cl$_2$, and 13.46% S. Theoretical: 25.38% C, 44.97% Cl$_2$ and 13.55% S. The melting point was 86°–87° C.

EXAMPLE II

N-thiotrichloromethyl morpholine was tested for fungicidal activity.

The Slide Germination Technique for fungicidal testing was carried out as described by Wellman and McCallan (Contributions of Boyce Thompson Institute, vol. 3, No. 3, pages 171–176). Against *Alternaria solani* and *Sclerotinia fructicola*, the fungicidal inhibiting concentration was in the range of from .01% to .001% and 0.001% to 0.0001%, respectively. These figures are concentrations of test compound in per cent to give an LD-50.

The new compounds of this invention may thus be applied to parent materials to retard or prevent fungus growth and mildew formation. Since they are exceptionally nonphytotoxic, they may be applied safely to a wide variety of plants. Some of the additional parent materials to which they may be applied for protective purposes are leather, wood, fur, wool, coated fabrics, and other substances.

They may be reduced to an impalpable powder and applied as an undiluted dust or mixed with a solid carrier, such as clay, talc, and bentonite, as well as other carriers known in the art (see Frear "Chemistry of Insecticides, Fungicides and Herbicides"). They may thus be applied as a spray in a liquid carrier, either as a solution in a solvent, or as a suspension in a non-solvent, such as water. When applied as a spray in water, it may be desirable to incorporate wetting agents.

The N-thiotrichloromethyl morpholine compound of this invention in general is soluble to a small extent in organic solvents such as acetone, ethyl alcohol, benzene, naphtha, chlorinated solvents, etc.

The water-soluble wetting agents that may be used in aqueous emulsions comprise the sulfates of long-chain alcohols such as dodecanol up to octadecanol, sulfonated amide and ester derivatives, sulfonated aromatics, and mixed alkyl-aryl sulfonate derivatives, esters of fatty acids such as the ricinoleic acid ester of sorbitol, and petroleum sulfonates of C$_{10}$ to C$_{20}$ length.

The non-ionic emulsifying agents such as the ethylene oxide condensation products of alkylated phenols may also be used. It is to be understood that these non-ionic emulsifying agents such as the ethylene oxide condensation products of alkylated phenols may also be used. It is to be understood that these and similar compounds are intended when the term "wetting agent" is used hereafter.

The compounds of this invention may also be admixed with carriers that are themselves active, such as other parasiticides, hormones, herbicides, fertilizers and wetting agents. Stomach and contact insecticides such as the arsenates, fluorides, rotenone, and the various fish poisons and organic insecticides, such as di(p-)chlorophenyl-trichloroethane, benzene-hexachloride, and similar products may also be advantageously added.

This invention has been described with respect to preferred embodiments but is not intended to be limited thereby.

What is claimed is:

1. As a new chemical compound, N-thiotrichloromethyl morpholine corresponding to the formula:

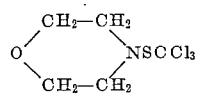

2. A fungicidal dust composition comprising N-thiotrichloromethyl morpholine corresponding to the formula:

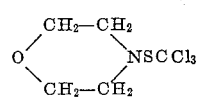

admixed with a powdered clay.

3. A fungicidal dust composition as in claim 2 in which the clay is bentonite.

4. A fungicidal composition containing N-thiotrichloromethyl morpholine corresponding to the formula:

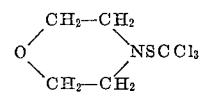

as the active ingredient admixed with a surface-active dispersing agent which lowers the surface tension of water and thereby promotes aqueous colloidal dispersions of the N-thiotrichloromethyl morpholine.

5. A fungicidal composition as in claim 4 in which the dispersing agent is a surface tension reducing agent for water selected from the group consisting of long-chain alcohol sulfates, sulfonated amide derivatives, sulfonated ester derivatives, sulfonated aromatic derivatives, sulfonated alkyl-aryl derivatives and petroleum sulfonates of C$_{10}$ to C$_{20}$ length.

6. A fungicidal composition comprising N-thiotrichloromethyl morpholine corresponding to the formula:

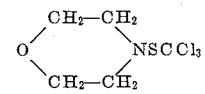

as the active ingredient dissolved in a solvent therefor.

7. A fungicidal composition comprising N-thiotrichloromethyl morpholine corresponding to the formula:

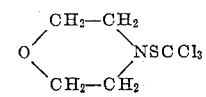

as the active ingredient admixed with a solid, powdered inert diluent.

8. A fungicidal composition comprising as the active ingredient N-thiotrichloromethyl morpholine corresponding to the formula:

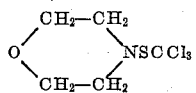

contained in an aqueous emulsion with a wetting agent.

ROGER S. HAWLEY.

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 2,045,888 | Tschunkur et al. | June 30, 1936 |
| 2,439,734 | Himel et al. | Apr. 13, 1948 |

OTHER REFERENCES

Ingram et al., Jour. Amer. Chem. Soc., (1942), vol. 64 pp. 2506–2507.